US010942659B2

(12) United States Patent
Moertl et al.

(10) Patent No.: US 10,942,659 B2
(45) Date of Patent: Mar. 9, 2021

(54) PERSISTENT LOGICAL TO VIRTUAL TABLE

(71) Applicant: International Business Machines Corporation, Armonk, NY (US)

(72) Inventors: Daniel F. Moertl, Rochester, MN (US); Andrew K. Martin, Austin, TX (US); Damir A. Jamsek, Austin, TX (US); Robert E. Galbraith, Rochester, MN (US); Rick A. Weckwerth, Oronoco, MN (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 16/429,871

(22) Filed: Jun. 3, 2019

(65) Prior Publication Data

US 2020/0379915 A1    Dec. 3, 2020

(51) Int. Cl.
*G06F 3/06* (2006.01)
*G06F 12/02* (2006.01)

(52) U.S. Cl.
CPC ............ *G06F 3/0626* (2013.01); *G06F 3/064* (2013.01); *G06F 3/0617* (2013.01); *G06F 3/0679* (2013.01); *G06F 12/0246* (2013.01); *G06F 2212/7201* (2013.01)

(58) Field of Classification Search
CPC .............................................. G06F 2212/7201
See application file for complete search history.

(56) References Cited

U.S. PATENT DOCUMENTS

| 8,407,449 | B1* | 3/2013 | Colon ................. G06F 12/0246 711/103 |
| 9,747,202 | B1* | 8/2017 | Shaharabany ........ G06F 12/123 |
| 9,870,153 | B2* | 1/2018 | Sinclair ................... G06F 3/061 |
| 2012/0005451 | A1* | 1/2012 | Lee ...................... G06F 12/0246 711/203 |
| 2012/0239869 | A1* | 9/2012 | Chiueh ............... G06F 12/0246 711/103 |
| 2013/0073897 | A1* | 3/2013 | Khmelnitsky ...... G06F 11/1417 714/6.11 |
| 2014/0189200 | A1* | 7/2014 | Gavens ............... G06F 12/0246 711/103 |
| 2016/0117112 | A1* | 4/2016 | Tomlin .................... G06F 12/10 711/103 |
| 2017/0090762 | A1* | 3/2017 | Ea .......................... G11C 29/82 |
| 2017/0315742 | A1 | 11/2017 | Christiansen et al. |

(Continued)

*Primary Examiner* — Nathan Sadler
(74) *Attorney, Agent, or Firm* — Patterson + Sheridan, LLP

(57) ABSTRACT

Techniques for persisting a logical address-to-virtual address table in a solid state storage device are presented. An example method includes receiving a request to write data to a logical block address (LBA) in a memory component of the solid state storage device. The data is written to a location identified by a virtual block address (VBA) in the solid state storage device. The VBA is stored in a rotating dump table in a reserved logical unit of the solid state storage device. A mapping between the LBA and the VBA is stored in a rotating journal table located in the reserved logical unit. The rotating journal table is buffered such that a number of journal entries are stored in a buffer until a threshold number of journal entries are committed to the rotating journal table. A pointer to a current address in the rotating journal is stored in the buffer.

20 Claims, 6 Drawing Sheets

(56) References Cited

U.S. PATENT DOCUMENTS

2018/0024919 A1* 1/2018 Geml .................. G06F 12/0246
 711/103
2018/0189155 A1 7/2018 Gunnam et al.
2019/0155749 A1* 5/2019 Hahn .................. G06F 12/0246

* cited by examiner

PERSISTENT LOGICAL TO VIRTUAL TABLE

BACKGROUND

The present invention relates to logical address-to-virtual address tables (LVTs) in solid state storage devices, and more specifically, to persisting LVTs in a solid state storage device.

Solid state storage devices generally are storage devices that use non-volatile circuits to store data, as opposed to magnetic storage, such as tape drives or hard disk drives, which use magnetic tape or magnetized drive platters to store data. Various types of solid state storage devices may be included in a computer system. Some of these storage devices may be flash memory (e.g., NAND flash) which may be susceptible to write amplification and other properties that may introduce latencies and reduce the endurance of these storage devices. For example, writing data to a NAND flash drive may entail reading data from a given location on the NAND flash drive, concatenating the read data with data to be written, erasing one or more blocks on the NAND flash drive, writing the concatenated data to a new location on the NAND flash drive, and marking the old location as available for use. Further, NAND flash drives may allow data to be written in smaller chunks than a minimum erase size (e.g., data may be written to pages that are smaller than the smallest block of memory that can be erased on the NAND flash drive), contributing to write amplification. To facilitate data operations on NAND flash drives, data and metadata may be written sequentially to a log structured array, and blocks on NAND flash drives may need to periodically be erased.

To achieve higher performance, other types of solid state memory, referred to as storage class memory (SCM) are being developed and deployed. SCM devices, such as 3D Xpoint, resistive random access memory (ReRAM), and spin transfer torque magnetic random access memory (STT-MRAM) devices, may achieve higher performance and endurance relative to NAND flash. For example, because SCM devices may not have a fixed minimum erase size (or may not require an erase operation), arbitrary sized chunks of data may be erased prior to reprogramming during a write operation. Further, SCM devices may operate without a log structured array and garbage collection.

LVTs generally include mappings between logical addresses (e.g., used by an operating system to access data on a storage device) and virtual addresses representing actual locations of data blocks on a storage device. Over time, mappings between logical addresses and virtual addresses may change because logical addresses may remain consistent, but virtual addresses at which data is written may change as elements on a solid state storage device wear out (e.g., due to elements reaching a limit on program/erase cycles) and as a device controller uses wear leveling techniques to manage program/erase cycles performed on different elements on the solid state storage device. Because LVTs generally include information that allows an operating system to access data on the storage device, LVTs may need to be built or restored prior to allowing a host device to access the storage device. LVTs may, however, contain a significant amount of data (e.g., on the order of multiple gigabytes for a storage device having multiple terabytes of capacity). Rebuilding an LVT by reading the entire storage device to obtain block metadata may be a time consuming procedure, and persisting the entirety of an LVT in storage (e.g., nonvolatile random access memory) may use a large amount of storage and entail significant time in order to persist the entirety of the LVT in storage. Further, because persisting the entirety of the LVT to storage may be a time consuming process, solid state storage devices that persist the entirety of the LVT to storage may include batteries or supercapacitors that provide power to the solid state storage device while the LVT is being persisted to storage.

SUMMARY

One embodiment of the present disclosure provides a method for persisting a logical address-to-virtual address table (LVT) in a solid state storage device. The method generally includes receiving a request to write data to a logical block address in a memory component of the solid state storage device. The data is written to a location identified by a virtual block address in the memory component of the solid state storage device. The virtual block address is stored in a rotating dump table in a reserved logical unit of the solid state storage device. A mapping between the logical block address and the virtual block address is stored in a rotating journal table located in the reserved logical unit of the solid state storage device. The rotating journal table is buffered such that a number of journal entries are stored in a buffer until a threshold number of journal entries are committed to the rotating journal table. A pointer to a current address in the rotating journal is stored in the buffer.

Another embodiment of the present disclosure provides a system having a processor and memory. The memory generally has instructions stored thereon which, when executed by the processor, performs an operation for persisting a logical address-to-virtual address table (LVT) in a solid state storage device. The operation generally includes receiving a request to write data to a logical block address in a memory component of the solid state storage device. The data is written to a location identified by a virtual block address in the memory component of the solid state storage device. The virtual block address is stored in a rotating dump table in a reserved logical unit of the solid state storage device. A mapping between the logical block address and the virtual block address is stored in a rotating journal table located in the reserved logical unit of the solid state storage device. The rotating journal table is buffered such that a number of journal entries are stored in a buffer until a threshold number of journal entries are committed to the rotating journal table. A pointer to a current address in the rotating journal is stored in the buffer.

Still another embodiment of the present disclosure provides a computer-readable medium having instructions stored thereon which, when executed by the processor, performs an operation for persisting a logical address-to-virtual address table (LVT) in a solid state storage device. The operation generally includes receiving a request to write data to a logical block address in a memory component of the solid state storage device. The data is written to a location identified by a virtual block address in the memory component of the solid state storage device. The virtual block address is stored in a rotating dump table in a reserved logical unit of the solid state storage device. A mapping between the logical block address and the virtual block address is stored in a rotating journal table located in the reserved logical unit of the solid state storage device. The rotating journal table is buffered such that a number of journal entries are stored in a buffer until a threshold number of journal entries are committed to the rotating journal table. A pointer to a current address in the rotating journal is stored in the buffer.

DETAILED DESCRIPTION

Embodiments described herein describe techniques for persisting an LVT in a solid state storage device (e.g., SCM devices) using information persisted to non-volatile memory and information stored in a reserved portion of the media capacity of the solid state storage device. By storing LVT information partially in a reserved portion of the media capacity of the solid state storage device and partially in non-volatile memory, an LVT (or portions of the LVT corresponding to updates to the LVT that have not been persisted to the reserved portion of the media capacity of the solid state storage device) may be persisted using a small amount of non-volatile memory, may be rapidly saved during power loss events (e.g., when the host device to which the solid state storage device is connected is shut down), and may be rapidly restored when the host device is powered on again. Further, because the amount of data to be saved to non-volatile memory may be less than the entirety of the LVT (e.g., may be a set of updates to the LVT), lower capacity power sources may be included on a solid state storage device to persist the LVT.

Figure 1:
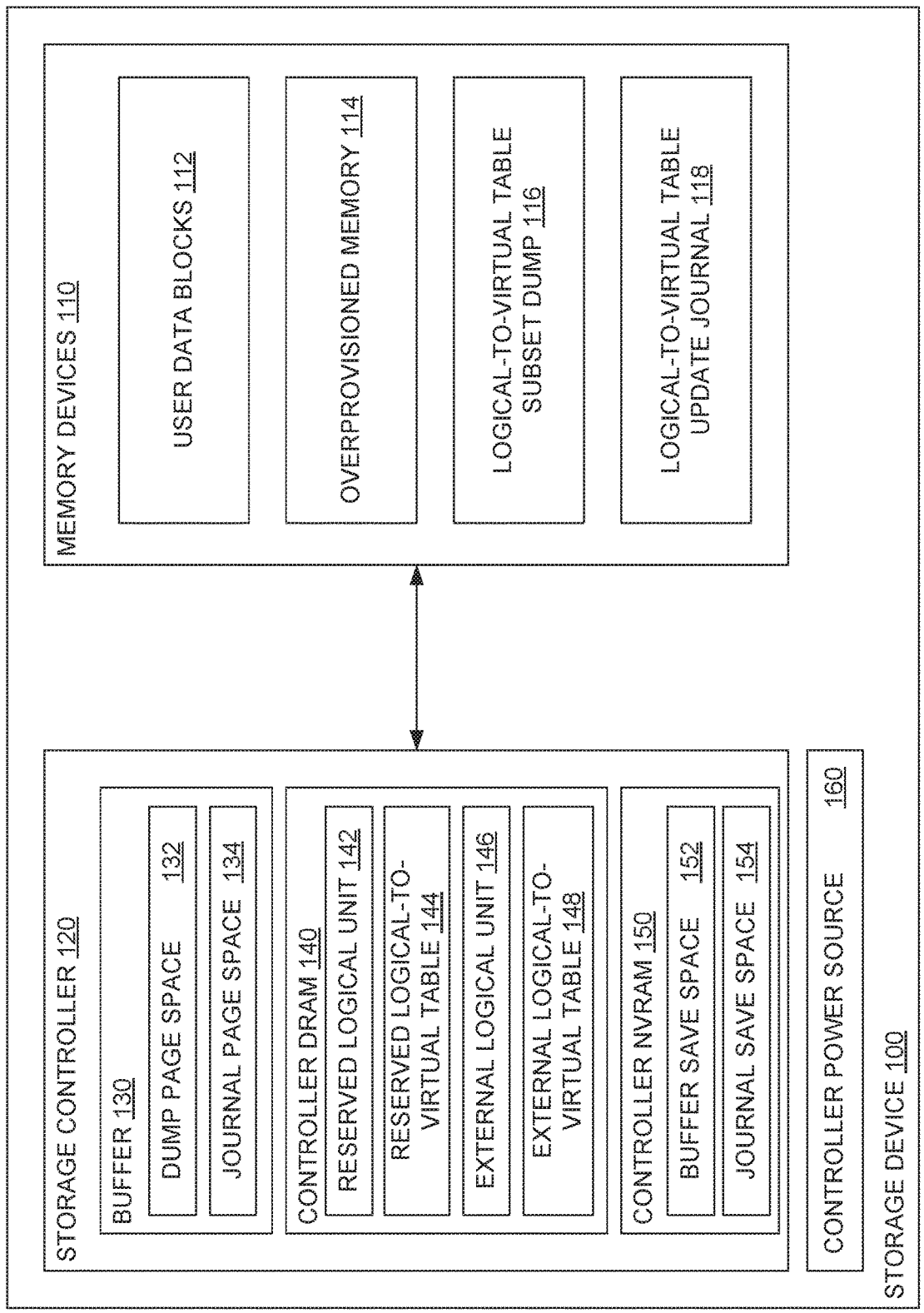
FIG. 1 illustrates a block diagram of an example solid state storage device in which a local address-to-virtual address table (LVT) is persisted on the solid state storage device, according to one embodiment.

FIG. 1 illustrates an example storage device 100 in which an LVT may be persisted and restored, according to an embodiment of the present disclosure. Storage device 100 may be a solid state storage device using storage class memory (SCM) modules, such as a nonvolatile dual inline memory module (NVDIMM), a storage device on an expansion card (e.g., a half-height-half-length (HHHL) PCI Express expansion card), etc. As illustrated, storage device 100 includes memory devices 110, a storage controller 120, and a controller power source 160.

Memory devices 110 generally represent one or more solid state storage modules (e.g., SCM chips) that may be aggregated (e.g., in an array) to store data in a computing system. The one or more solid state storage modules may be discrete integrated circuit packages including a plurality of memory cells storing individual bits of data. As illustrated, memory devices 110 may be partitioned into user data blocks 112, overprovisioned memory 114, a logical-to-virtual table subset dump 116, and a logical-to-virtual table update journal 118.

User data blocks 112 generally represent user-accessible (readable/writeable) locations in memory devices 110. User data blocks 112 may be partitioned into a plurality of partitions (logical units), represented by logical unit numbers (LUNs) in storage. During read operations, storage controller 120 generally receives a request to read information from a specified logical address, which, as discussed in further detail below, is mapped to a virtual address representing a location of one or more memory cells in memory devices 110 to read data from, access the data from user data blocks 112 at the virtual address, and returns the requested data. During write operations, storage controller 120 generally receives a request to write specified information to a particular logical address. Due to wear leveling and other functions used to distribute program/erase cycles across the memory cells in memory devices 110, the specified information may be written to memory cells at a different virtual address than the memory cells at the virtual address currently mapped to the particular logical address. For example, the specified information may be written to unused data blocks in user data blocks 112. In some cases, where a memory cell has reached the end of its usable lifespan (e.g., has reached a threshold number of program/erase cycles), the memory cell may be marked as unwriteable for future operations, and a memory cell from overprovisioned memory 114 may be added to user data blocks 112 for future use.

Overprovisioned memory 114 generally represents a reserved set of memory cells on memory devices 110 that are excluded from user data blocks 112 (and thus, generally not visible to other devices interfacing with storage device 100 or to a file system on storage device 100). Over time, memory cells in overprovisioned memory 114 may be used to replace failed memory cells in user data blocks 112 (e.g., memory cells that are marked invalid, have reached the end of their usable lifespan, etc.).

Logical-to-virtual table subset dump 116 generally represents an area in memory device 110 reserved for storing blocks containing information about the logical address-to-virtual address table for a logical unit (e.g., a drive partition) including user data blocks 112. Generally, logical-to-virtual table subset dump 116 may be indexed by logical block address and include a plurality of entries including the virtual block address mapped to a logical address in the logical-to-virtual table for the logical unit including user data blocks 112. Generally, logical-to-virtual table subset dump 116 may be indexed by logical block address and may store pages of virtual block addresses to which data has been written to user data blocks 112.

Logical-to-virtual table update journal 118 generally stores a plurality of pages mapping logical block addresses of the logical unit including user data blocks 112 to the virtual block addresses at which data is stored in user data blocks 112. Generally, logical-to-virtual table subset dump 116 and logical-to-virtual table update journal 118 may be sized based on the number of logical block addresses in one or more external logical units (e.g., a drive partition) such that the entirety of the one or more external logical units can be mapped by reading logical-to-virtual subset dump 116 and logical-to-virtual table update journal 118.

Storage controller 120 generally processes requests to read and write data to user data blocks 112 in memory devices 110 and maintains the logical-to-virtual table used to identify the location of data in user data blocks 112 for each logical block address exposed outside of storage device 100. As illustrated, storage controller 120 includes a buffer 130, controller dynamic random access memory (DRAM) 140, and controller non-volatile random access memory (NVRAM) 150.

Buffer 130 generally is a temporary location at which virtual block addresses and logical-to-virtual block address mappings are written until a threshold number of entries are written to the buffer 130. As illustrated, buffer 130 includes a dump page store 132 and journal page store 134. Generally, dump page space 132 may provide a buffer storing virtual block addresses identifying where data has been written, and journal page space 134 may provide a buffer storing mappings between logical block addresses and virtual block addresses for newly stored data.

Buffer 130 may be configured to temporarily store virtual block addresses and logical-to-virtual block address mappings until a threshold number of entries has been written to buffer 130. When the threshold number of entries are written to buffer 130, a page of entries may be written to logical-to-virtual table subset dump 116 and logical-to-virtual table update journal 118. The threshold number may be set a priori based on a block size, or the minimum size of any data written to memory devices 110, and the content written to each dump page space 132 and journal page space 134. For example, where memory devices 110 are addressed using 32-bit (4-byte) logical and virtual addresses and the block size for a write on memory devices 110 is set at 4 kilobytes (i.e., 4*1024=4096 bytes), dump page store 132 may be configured to buffer 1024 virtual block address entries (1024 entries=4096 bytes/4 bytes per entry) until dumping the contents of dump page space 132 to logical-to-virtual table subset dump 116. Meanwhile, journal page space 134 may be configured to buffer 512 journal entries (512 entries=4096 bytes/8 bytes per entry) prior to writing a page of journal entries to logical-to-virtual table update journal 118. On power down, as discussed in further detail below, the contents of buffer 130 saved to controller NVRAM 150 may include journal pages space 134.

Controller DRAM 140 generally stores LVT for one or more partitions of user data blocks 112 on storage device 100 and a reserved LVT for a reserved logical unit used to access the logical-to-virtual table subset dump 116 and logical-to-virtual table update journal 118. As illustrated, controller DRAM includes a reserved logical unit 142 and a reserved logical-to-virtual table 144. Reserved logical unit 142 generally comprises a set of logical block addresses mapped to virtual block addresses of memory cells in the logical-to-virtual table subset dump 116 and the logical-to-virtual table update journal 118. To access specific data in the logical-to-virtual table subset dump 116 and the logical-to-virtual table update journal 118, the controller can use mappings of logical addresses to virtual addresses in the reserved logical-to-virtual table 144 to obtain the virtual address of the memory cells associated with a given logical address and read the memory cells at the obtained virtual address. Controller DRAM further includes one or more external logical units 146 and one or more corresponding external logical-to-virtual tables 148. Each external logical unit 146 generally comprises logical block addresses mapped to virtual block addresses of memory cells in the corresponding external logical-to-virtual table 148, and each external logical-to-virtual table 148 generally includes mappings of logical addresses to virtual addresses that storage controller 120 can use to obtain a virtual address of the memory cells in an external logical unit to read data from.

Controller NVRAM 150 generally is an amount of non-volatile storage used to persist information about the logical-to-virtual address mappings for the reserved logical unit 142 (e.g., reserved logical unit including the logical-to-virtual table subset dump 116 and logical-to-virtual table update journal 118) and information included in buffer 130 when storage device 100 is disconnected from a power source (e.g., when the computer system to which storage device 100 is connected is powered down). When storage device 100 is reconnected to a power source, storage controller 120 can restore the logical-to-virtual table for the reserved logical unit, read the contents of logical-to-virtual table update journal 118 and logical-to-virtual table subset dump 116, and apply changes to the logical-virtual table for the logical unit(s) containing user data blocks 112 from information saved to buffer save space 152 and journal save space 154 in the controller NVRAM 150. After the changes are applied to the logical-to-virtual table for the logical unit(s), storage device 100 may be declared ready for use. In some embodiments, and as illustrated, controller NVRAM 150 may be integrated into an application specific integrated circuit (ASIC) on which a storage device controller is stored. It should be recognized, however, that NVRAM 150 may be an independent component on storage device 100 separate from storage controller 120.

Controller power source 160 generally is configured to provide sufficient power to storage controller 120 to allow information from buffer 130 to be saved to controller NVRAM 150 when storage device 100 encounters a power loss event. Controller power source 160 may be a capacitor or set of capacitors which may be charged via a connection to a power source on a computer system to which storage device 100 is connected and may be discharged via a connection to storage controller 120. As discussed, because the amount of data stored in controller NVRAM 150 may be relatively small (e.g., a number of 4-byte dump entries, 8-byte journal entries, and memory address pointers identifying the most recent update to logical-to-virtual table update journal), controller power source 160 need only store a sufficient amount of power to write a number of megabytes to controller NVRAM 150, as opposed to potentially gigabytes of data if an entire logical-to-virtual address table were to be saved to controller NVRAM 150.

Figure 2:
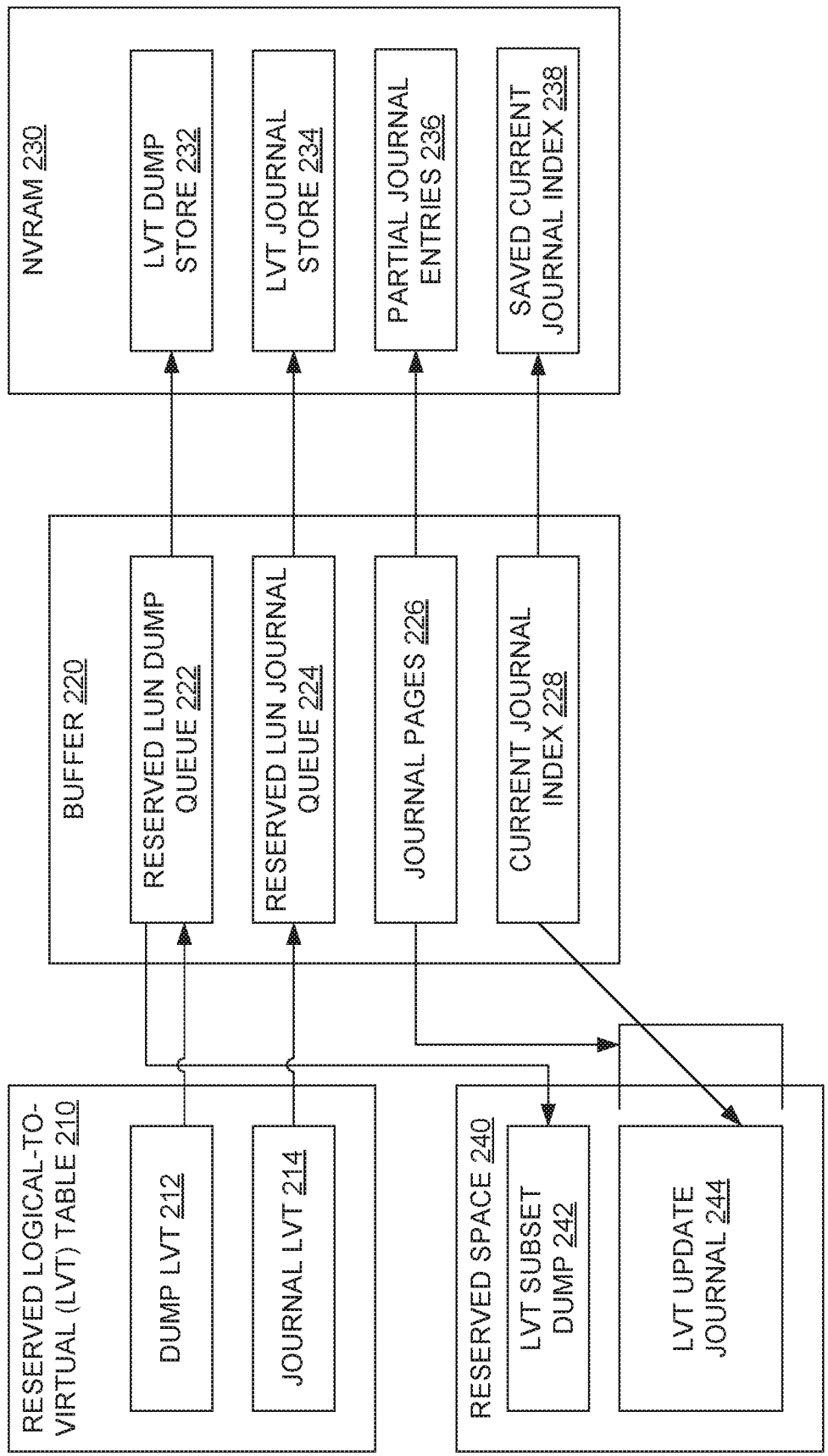
FIG. 2 illustrates communications between components in a solid state storage device to persist and restore an LVT for the solid state storage device, according to one embodiment.

FIG. 2 illustrates communications between components in a solid state storage device to persist and restore an LVT for the solid state storage device, according to one embodiment. As illustrated, a reserved logical-to-virtual (LVT) table 210, buffer 220, NVRAM 230, and reserved space 240 may be used to persist and restore an LVT for one or more logical units including user data blocks 112 illustrated in FIG. 1.

Reserved logical-to-virtual table 210 generally maps logical addresses to virtual addresses in reserved space 240 in which LVT dumps and update journal entries are stored. As illustrated, reserved logical-to-virtual table 210 includes a dump LVT 212 and a journal LVT 214. Dump LVT 212 generally maps logical addresses in a reserved logical unit to virtual addresses in LVT subset dump 242 of reserved space 240, which represents an area storing pages of virtual block addresses in user-accessible logical units of a solid state storage device. Journal LVT 214 generally maps logical addresses in a reserved logical unit to virtual addresses in LVT update journal 244, which represents an area storing pages of logical address-to-virtual-address mappings in the user-accessible logical units of the solid state storage device. Generally, the contents of reserved logical-to-virtual table 210 may be saved to NVRAM 230 when the solid state storage device loses power (e.g., the host device to which the solid state storage device is connected is shut down, whether intentionally or unintentionally).

Buffer 220 generally represents a temporary storage space in which information about logical block address and virtual block addresses to which data has been written are stored until written to reserved space 240 or committed to NVRAM 230. As illustrated, buffer 220 includes a reserved LUN dump queue 222, a reserved LUN journal queue 224, journal pages 226, and current journal index 228. Reserved LUN dump queue 222 generally includes information about the virtual block addresses associated with reserved space 240 in the solid state storage device in a first-in, first-out data structure. Entries in the reserved LUN dump queue 222 may track information written to logical-to-virtual table subset dump 242 (e.g., what virtual addresses have had pages written to them during operation of the solid state storage device). Likewise, reserved LUN journal queue 224 may track journal entries written to logical-to-virtual table update journal 244 during operation of the solid state storage device. On power down, the contents of reserved LUN dump queue 222 may be stored in LVT dump store 232 in NVRAM 230, and the contents of reserved LUN journal queue 224 may be stored in LVT journal store 234. When the solid state storage device is reconnected to a power source, the reserved logical-to-virtual table 210 may be partially restored by reading the contents of LVT dump store 232 and LVT journal store 234 to dump LVT 212 and journal LVT 214, respectively.

To fully capture updates to logical-to-virtual address mappings in user-accessible logical units of a solid state storage device, buffer 220 may further include a space to buffer journal entries in journal pages 226. Generally, journal pages 226 may include journal entries of logical address-to-virtual address mappings that have not been committed to a page in LVT update journal 244 of reserved space 240. Each journal entry may correspond to a write operation performed on memory cells in a user-accessible logical unit of the solid state storage device and indicate that the latest written data for a given logical address is located at the mapped virtual address in the solid state storage device. This mapping, as discussed above, may change over time, as data may not be written to the same memory cell mapped to a logical block address so as to evenly distribute erase/program cycles across different memory cells in the solid state storage device. Because solid state storage devices may have a minimum write size defined a priori for the device (e.g., a minimum write size of a 4 kilobyte block), journal entries mapping logical addresses in a user-accessible logical unit to virtual addresses of the memory cells in which data is written (or reserved entries indicating that a logical block address is trimmed, or contains data that is no longer in use) may not be persisted to LVT update journal 244. Thus, a threshold number of journal entries may need to be written to journal pages 226 before the journal entries may be committed to LVT update journal 244.

If the solid state storage device powers off without saving these journal entries, a data loss event or other data inconsistency may occur on the solid state storage device. To avoid a data loss event, the journal entries buffered in journal pages 226 may be stored in partial journal entries 236 in NVRAM 230 when the host device to which the solid state storage device is connected powers down. When the solid state storage device powers up, a device controller on the solid state storage device can apply the updated logical address-to-virtual address mappings in the partial journal entries 236 to the LVT restored from LVT subset dump 242 and LVT update journal 244 in order to correctly map logical addresses to virtual addresses in the user-accessible logical units of the solid state storage device.

Buffer 220 generally maintains a current journal index 228 pointing to a location in the LVT update journal at which the last page of journal updates was performed. The journal index may be, for example, a logical block address of the last page written to LVT update journal 244. The current journal index 228 may be used to identify the next page to overwrite in LVT update journal 244 when journal pages 226 include a sufficient number of entries to commit to LVT update journal 244. When the solid state storage device loses power, the current journal index may be written to saved current journal index 238 in NVRAM 230. When power is reconnected to a solid state storage device, a device controller can use the saved current journal index 238 to identify the most recent page of journal updates to the LVT and restore the LVT based on the contents in LVT update journal 244 (e.g., by starting from the LVT update journal page at a location after saved current journal index 238 and modifying the LVT for the user-accessible logical units sequentially through the page associated with the saved current journal index 238).

Figure 3:
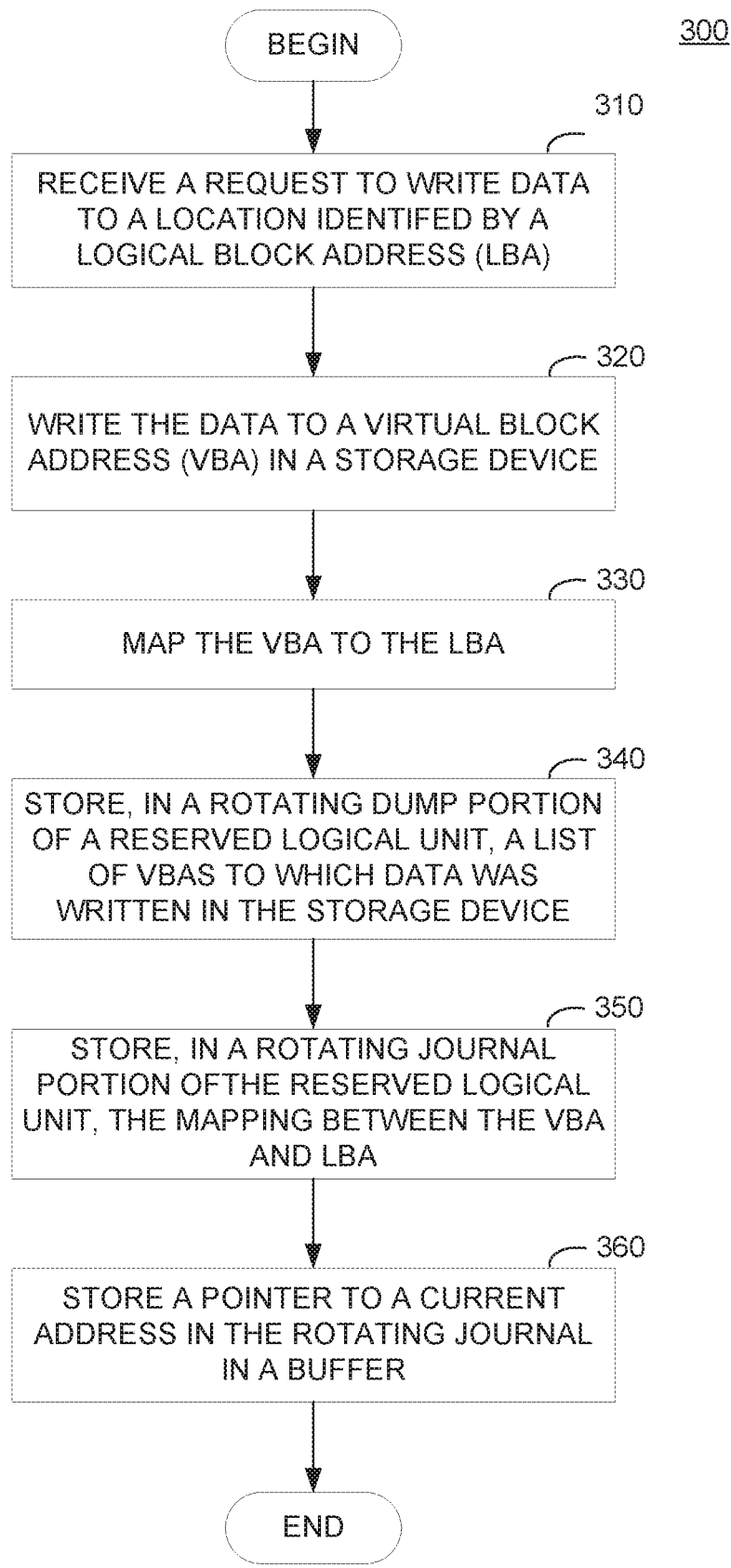
FIG. 3 illustrates example operations for writing data to a solid state storage device and updating an LVT, according to one embodiment.

FIG. 3 illustrates example operations that may be performed by a solid state storage device controller (e.g., storage controller 120 illustrated in FIG. 1) to write data to a user-accessible logical unit in a solid state storage device, according to an embodiment. As illustrated, operations 300 begin at block 310, where a solid state storage device controller receives a request to write data to a location identified by a logical block address (LBA). The logical block address, as discussed above, generally abstracts the details about the exact location of data in user data blocks 112 of a solid state storage device so that a computing device or applications executing thereon can access data without needing to know the exact physical location of data in the solid state storage device.

At block 320, the solid state storage device controller writes the data to a virtual block address (VBA) in the solid state storage device. The solid state storage device controller may select the virtual block address based on information about the number of erase/program cycles performed on each memory cell or block of memory cells in the solid state storage device so as to evenly distribute erase/program cycles across the solid state storage device. For example, on an previously unused solid state storage device, the solid state storage device controller may choose an unused virtual block address at random. As the solid state storage device ages, the solid state storage device controller may perform write operations on memory cells having fewer erase/program cycles before performing write operations on memory cells having a larger number of erase/program cycles.

At block 330, the solid state storage device maps the VBA to the LBA. The mapping may be, for example, a series of bits storing both the LBA and the VBA. Because the LBA and VBA may have a priori fixed sizes, the mapping need not explicitly indicate which address in the mapping corresponds to the LBA and the VBA.

At block 340, the solid state storage device stores, in a rotating dump, a list of VBAs to which data was written in the storage device. The rotating dump may be periodically committed to a reserved logical unit (e.g., to LVT subset dump 116 illustrated in FIG. 1) when a sufficient number of write operations has been performed on the solid state storage device to allow for a page of VBAs to be written to the reserved logical unit. Generally, a portion of the rotating dump (e.g., a 4 kilobyte page) may be periodically stored to media based on the rate of incoming writes to the solid state storage device controller. Each portion of the rotating dump may be stored in a rotating manner (e.g., round robin) and may not be directly related to the incoming write operations processed by the solid state storage device controller. Because the dump table on the media may be out of date, entries in the rotating journal may be used to update the dump and recreate the original logical-to-virtual table for a logical unit (e.g., drive partition).

At block 350, the solid state storage device controller stores, in a rotating journal, the mapping between the VBA and LBA. When a threshold number of write operations has been performed to allow for a page of data to be written to a reserved logical unit (e.g., to LVT update journal 118 illustrated in FIG. 1), a page of LBA to VBA mappings may be written to the rotating journal, replacing an old page of journal updates previously stored in the rotating journal.

At block 360, the solid state storage controller stores, in a buffer, a pointer to a current address in the rotating journal. The pointer to the current address in the rotating journal may be used, as discussed above, to identify the most recent batch of updates to the LVT for a user-accessible logical unit. This pointer may be maintained so that the LVT can be restored by sequentially updating the LVT for the user-accessible logical unit from oldest journal entries (e.g., journal entries at the page after the page identified by the current address pointer in a rotating journal) to newest journal entries (e.g., journal entries at the page identified by the current address pointer).

Figure 4:
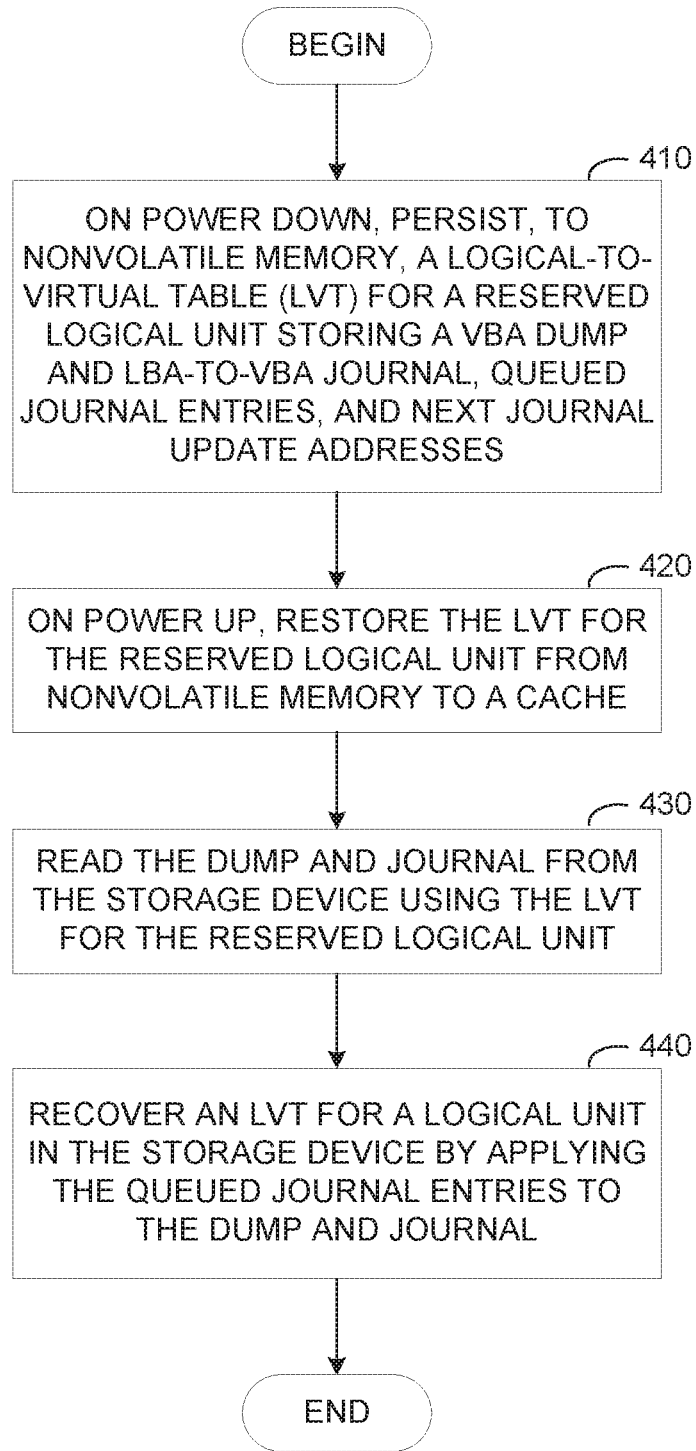
FIG. 4 illustrates example operations for persisting an LVT to non-volatile memory on system power down, according to one embodiment.

FIG. 4 illustrates example operations for persisting a LVT for a user-accessible logical unit to non-volatile memory by a solid state storage device controller, according to an embodiment. As illustrated, operations 400 begin at block 410, where, upon device power down, the solid state storage device controller persists a logical-to-virtual table (LVT) for a reserved logical unit, queued journal entries, and a current journal entry pointer to non-volatile memory. The LVT for the reserved logical unit may comprise, as discussed above, logical-to-virtual address mappings for an LVT subset dump and an LVT update journal in a reserved space of the solid state storage device in which LVTs for user-accessible logical units may be stored. As discussed, the LBA subset dump may be indexed by logical block address and may comprise information identifying the virtual block address in a user-accessible logical unit mapped to any given LBA. The LBA update journal may comprise entries mapping logical block addresses to virtual block addresses in the user-accessible logical unit that may be generated when data is written (or re-written) to a given logical block address. As discussed above, the mappings between logical block addresses and virtual block addresses may change over time due to wear leveling techniques used to distribute erase/program cycles across memory cells in a solid state storage device and due to replacement of failed cells with overprovisioned memory cells.

At block 420, upon device power up, the solid state storage device controller restores the LVT for the reserved logical unit from nonvolatile memory to a cache. The cache may be, for example, dynamic random access memory or other volatile memory used by the solid state storage device controller while solid state storage device is operating to identify the memory cells to read data from in response to a read request. The LVT for the reserved logical unit generally maps logical addresses to virtual addresses for content stored in the reserved logical unit, which generally contains logical block addresses, virtual block addresses, and mappings between logical block addresses for a user-accessible logical unit on a solid state storage device.

At block 430, the solid state storage controller reads the dump and journal from the storage device using the LVT for the reserved logical unit. Generally, reading the dump and journal from the storage device allows the LVT for the user-accessible logical unit(s) to be restored, as virtual block addresses mapped to logical block addresses in the dump (i.e., virtual block addresses located at a given LBA index) may be modified by updated LBA to VBA mappings stored in one or more journal entries in LVT update journal. To restore the LVT for the user-accessible logical unit(s) from the dump and journal in the storage device, the solid state storage controller may initially read the dump and update the LVT for the user-accessible logical unit(s) in cache based on the virtual block addresses in the LVT subset dump. In some embodiments, as discussed in further detail below, failure to read pages from the dump may result in certain logical block addresses being marked as logically bad, and read requests to these logical block addresses may return a reserved value indicating that the logical block address is logically bad.

After restoring the LVT from the dump, the solid state storage device controller may read the journal to update the LVT restored from the dump. Generally, to update the LVT restored from the dump, the solid state storage device controller may read journal entries from oldest to newest and update logical block address to virtual block address mappings based on the contents of the journal. The solid state storage device controller may use the saved current journal index in nonvolatile memory to identify the page with the oldest journal entries in the journal. As discussed above, the journal may be a rotating journal, where new pages of journal entries are written over the oldest pages of journal entries. Thus, the oldest page of journal entries may be the page after the page identified by the saved current journal index. In some cases, and as discussed in further detail below, if the solid state storage device controller is unable to read a journal entry, the solid state storage device may declare a data integrity event. Such a data integrity event may indicate that data may be lost. In some cases, a data integrity event may be used to indicate that the solid state storage device should be taken out of service and replaced.

At block 440, the solid state storage device controller recovers an LVT for a logical unit in the storage device by applying the queued journal entries to the LVT restored from the dump and journal. Generally, applying the queued journal entries to the LVT restored from the dump and journal may entail applying the queued journal entries from oldest to newest. After applying the queued journal entries to the LVT restored from the dump and journal, the LVT for the user-accessible logical unit may be fully restored, and the solid state storage device may be declared available for use by a host system.

Figure 5:
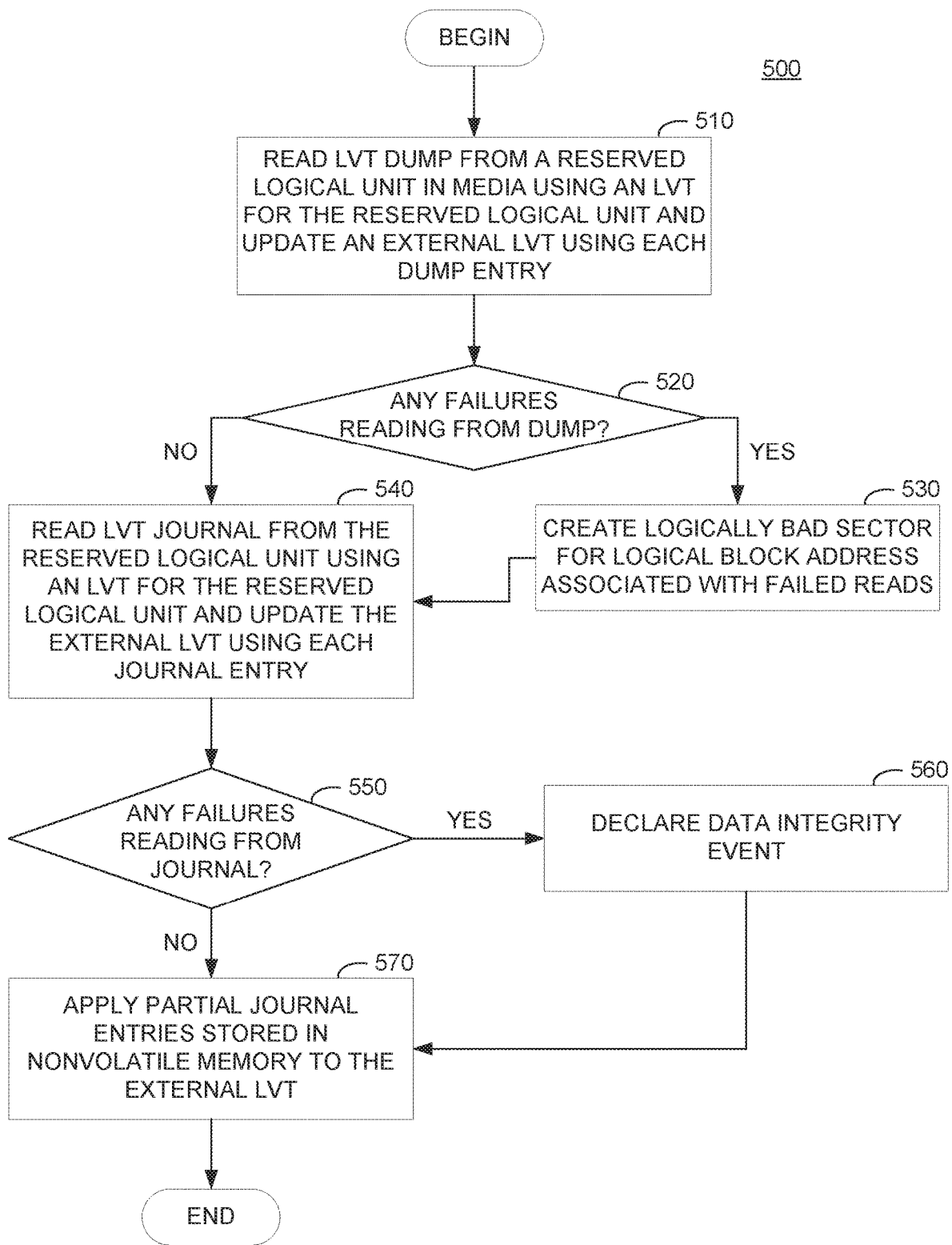
FIG. 5 illustrates example operations for restoring an LVT from non-volatile memory, according to one embodiment.

FIG. 5 illustrates example operations 500 that may be performed by a solid state storage device controller to restore an LVT for a user-accessible logical unit from a dump and journal stored in a reserved portion of a storage device, according to an embodiment. As illustrated, operations 500 begin at block 510, where the solid state storage device controller reads an LVT dump from a reserved logical unit in media using an LVT for the reserved logical unit and updating an external LVT using each dump entry. As discussed, the LVT dump may be indexed by logical block address for the external logical unit and may include information about the virtual block address corresponding to each logical block address in the LVT for the external logical unit.

At block 520, the solid state storage device controller determines whether any failures were encountered in reading from the dump. If the solid state storage device controller determined that there were no failures reading from the dump at block 520, operations 500 may proceed to block 540, discussed in further detail below. If, however, any failures were encountered in reading from the dump, at block 530, the solid state storage device controller creates a logically bad block for the logical block address associated with the failed reads. Generally, creating a logically bad block for the logical block addresses associated with the failed reads may result in the logical block addresses associated with the failed reads being mapped to a reserved virtual block address indicating that the data at a logical block address is invalid. This reserved virtual block address may, for example, be interpreted by the solid state storage device controller as a zero value. Subsequently, operations 500 may proceed to block 540.

At block 540, the solid state storage device controller reads an LVT journal from a reserved logical unit in media using an LVT for the reserved logical unit and updates the external LVT using each journal entry. As discussed, each journal entry represents a set of updates to perform on the LVT to update mappings between logical block addresses and virtual block addresses in the external LVT. To update the external LVT using the LVT journal stored in the reserved logical unit, the solid state storage device controller may use a pointer to the latest journal update in the reserved logical unit to identify the page containing the oldest journal updates (e.g., the page subsequent to the latest journal update in a rotating journal). The solid state storage device controller can read journal entries from oldest to newest and apply the updated logical address to virtual address mappings to the external LVT.

At block 550, the solid state storage device controller determines whether there were any failures reading from the LVT journal. If the solid state storage device controller did not encounter any failures in reading from the LVT journal, operations 500 may proceed to block 570, discussed in further detail below. If, however, the solid state storage device controller failed to successfully read from the LVT journal, at block 560, the solid state storage device controller may declare a data integrity event on the solid state storage device. Generally, declaring a data integrity event may indicate that data has been lost or is otherwise inconsistent on the solid state storage device and may be used to indicate that the solid state storage device should be taken out of service. After declaring the data integrity event, operations 500 may proceed to block 570, as illustrated, or may terminate. In some embodiments, when an error is encountered in reading from the LVT journal, the solid state storage device controller may halt reading from the LVT journal, thus restoring the LVT up to the previous journal entry from the entry that the solid state storage device controller failed to read successfully.

At block 570, the solid state storage device controller finalizes restoration of the LVT for the external logical unit by applying the partial journal entries stored in non-volatile memory to the external LVT. As discussed, the journal entries stored in non-volatile memory may represent changes to the logical address-to-virtual address mappings that were not committed to the LVT update journal prior to the storage device losing power. The journal entries may comprise a number of journal entries less than a threshold number needed to write the journal entries to a page in the LVT journal.

Figure 6:
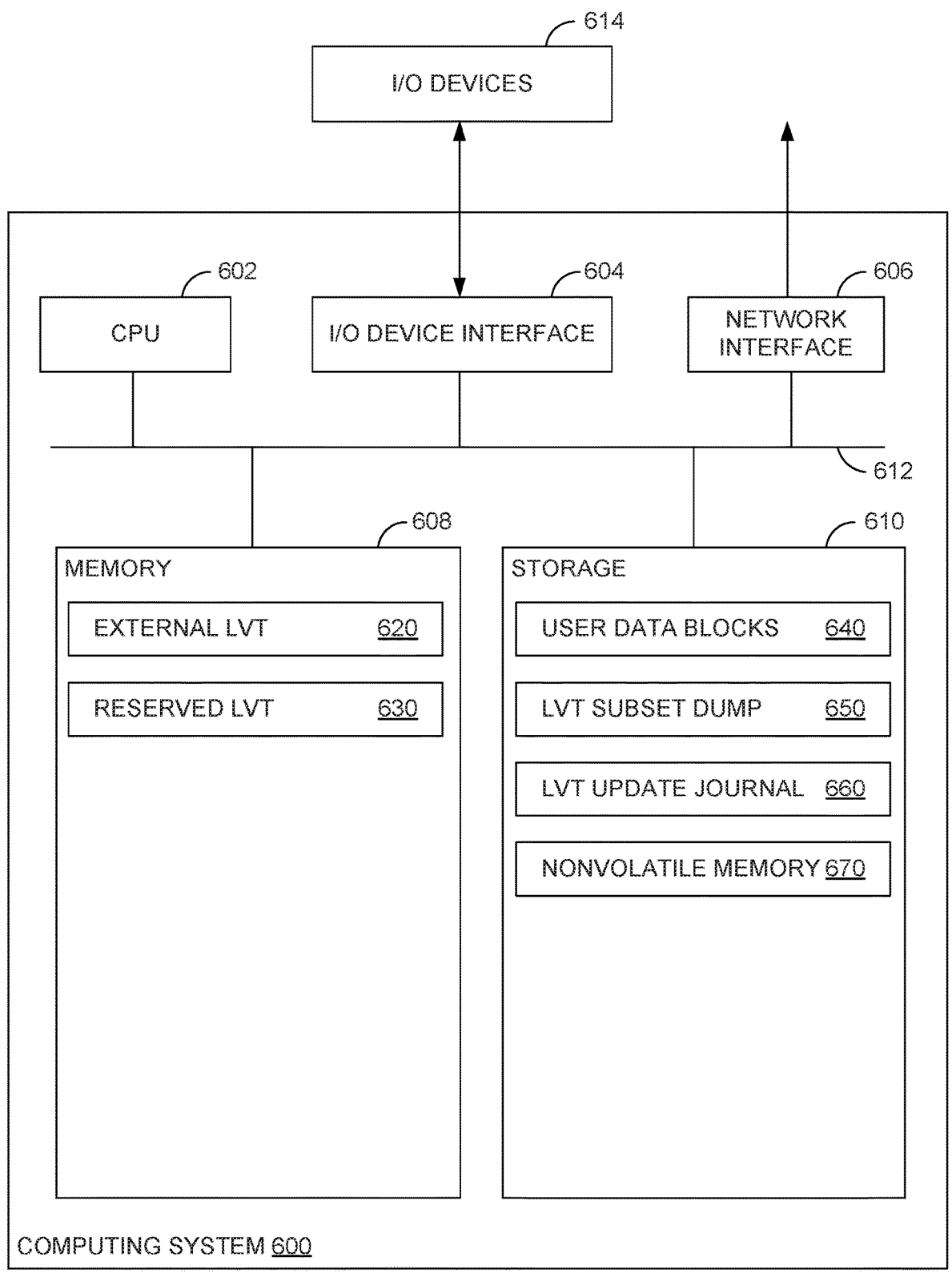
FIG. 6 illustrates an example system in which aspects of the present disclosure may be performed.

FIG. 6 illustrates an example system 600 that uses a reserved portion of a storage device and nonvolatile memory to persist a logical-to-virtual table (LVT) for one or more user-accessible (external) logical units on the storage device, according to an embodiment. As shown, system 600 includes, without limitation, a central processing unit 602, one or more I/O device interfaces 604, which may allow for the connection of various I/O devices 614 (e.g., keyboards, displays, mouse devices, pen input, etc.) to the system 600, network interface 606, a memory 608, storage 610, and an interconnect 612.

CPU 602 may retrieve and execute programming instructions stored in the memory 608. Similarly, the CPU 602 may retrieve and store application residing in the memory 608. The interconnect 612 transmits programming instructions and application data among the CPU 602, I/O device interface 604, network interface 606, memory 608, and storage 610. CPU 602 is included to be representative of a single CPU, multiple CPUs, a single CPU having multiple processing cores, and the like. Additionally, the memory 608 is included to be representative of a random access memory. Furthermore, storage 610 may be a disk drive. Although shown as a single unit, the storage 610 may be a combination of fixed and/or removable storage devices, such as fixed disc drives, solid state drives, removable memory cards or optical storage, network attached storage (NAS), or a storage area network (SAN).

As illustrated, memory 608 includes an external LVT 620 and a reserved LVT 630. External LVT 620 generally includes logical address-to-virtual address mappings for one or more logical units composed of memory cells in user data blocks 640. External LVT 620 may be restored on system power on based on the contents of LVT subset dump 650, LVT update journal 660, and partial journal entries stored in nonvolatile memory 670. Reserved LVT 630 generally includes logical address-to-virtual address mappings for a reserved logical unit including LVT subset dump 650 and LVT update journal 660. Generally, reserved LVT 630 may be restored from a copy of the reserved LVT stored in nonvolatile memory 670 when system 600 is powered down.

Storage 610, as illustrated, includes user data blocks 640, LVT subset dump 650, LVT update journal 660, and nonvolatile memory 670. User data blocks 640 generally represent portions of storage 610 that may be included in a user-accessible (external) logical unit and may be used to store user data. Logical address-to-virtual address mappings for logical units including memory circuits in user data blocks 640 may be stored in external LVT 620 during operation of system 600 and may be persisted to nonvolatile memory 670 when the system is powered down. LVT subset dump 650 is generally mapped to logical block addresses for the user-accessible logical unit, and each logical block address represented by a position in LVT subset dump 650 may be mapped to a virtual block address referencing a particular memory cell in user data blocks 640. LVT update journal 660 may be a rotating journal in which updates to the logical address-to-virtual address mappings for the user-accessible logical unit are stored. These updates may be written to LVT update journal to represent new locations of data in user data blocks 640 referenced by a given logical address when a write operation is performed on the given logical address. Nonvolatile memory 670 generally stores the contents of reserved LVT 630, information about the last journal page written to LVT update journal 660, and partial buffered journal entries that have not yet been written to LVT update journal 660. This data may be written to nonvolatile memory 670 when system 400 powers down and may be restored to external LVT 620 when system 600 is powered on, as discussed above.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

In the following, reference is made to embodiments presented in this disclosure. However, the scope of the present disclosure is not limited to specific described embodiments. Instead, any combination of the following features and elements, whether related to different embodiments or not, is contemplated to implement and practice contemplated embodiments. Furthermore, although embodiments disclosed herein may achieve advantages over other possible solutions or over the prior art, whether or not a particular advantage is achieved by a given embodiment is not limiting of the scope of the present disclosure. Thus, the following aspects, features, embodiments and advantages are merely illustrative and are not considered elements or limitations of the appended claims except where explicitly recited in a claim(s). Likewise, reference to "the invention" shall not be construed as a generalization of any inventive subject matter disclosed herein and shall not be considered to be an element or limitation of the appended claims except where explicitly recited in a claim(s).

Aspects of the present invention may take the form of an entirely hardware embodiment, an entirely software embodiment (including firmware, resident software, microcode, etc.) or an embodiment combining software and hardware aspects that may all generally be referred to herein as a "circuit," "module" or "system."

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

While the foregoing is directed to embodiments of the present invention, other and further embodiments of the invention may be devised without departing from the basic scope thereof, and the scope thereof is determined by the claims that follow.

What is claimed is:

1. A method for writing data to a solid state storage device, comprising:
   receiving a request to write data to a logical block address in a memory component of the solid state storage device;
   writing the data to a virtual block address in the memory component of the solid state storage device;
   storing the virtual block address in a logical-to-virtual table (LVT) subset dump located in a reserved logical unit of the solid state storage device, wherein the LVT subset dump comprises a rotating dump in which information about write operations is periodically written to the solid state storage device based on a rate of incoming write requests to a controller of the solid state storage device such that newest writes to the rotating dump overwrite oldest data in the rotating dump;
   storing a mapping between the logical block address and the virtual block address in a LVT update journal located in the reserved logical unit of the solid state storage device, wherein the LVT update journal is buffered such that a number of journal entries are stored in a buffer until a threshold number of journal entries are committed to the LVT update journal; and
   storing a pointer to a current address in the LVT update journal in the buffer at which the mapping between the logical block address and the virtual block address is stored.

2. The method of claim 1, further comprising:
   upon losing power supplied to the solid state storage device, storing the LVT subset dump and the LVT update journal in a non-volatile memory component of the solid state storage device, and storing journal entries in the buffer to the non-volatile memory component of the solid state storage device.

3. The method of claim 2, wherein the LVT subset dump and the LVT update journal and the buffered journal entries are written to the non-volatile memory component within a discharge time of a capacitor in the solid state storage device.

4. The method of claim 2, further comprising:
   upon reconnecting the solid state storage device to a power source:
      restoring the LVT subset dump and the LVT update journal rotating journal from the non-volatile memory component of the solid state storage device to the cache of the solid state storage device, and
      restoring a logical address-to-virtual address table of an external logical unit based on the LVT subset dump, the LVT update journal, and the buffered journal entries.

5. The method of claim 4, further comprising:
   identifying a failure to restore the LVT subset dump from the non-volatile memory component; and
   upon receiving a request for data stored at a logical block address included in the LVT subset dump, returning a reserved value.

6. The method of claim 4, further comprising:
   identifying a failure to restore the LVT update journal from the non-volatile memory component; and
   restoring a previously committed LVT update journal from a reserved portion of the memory component of the solid state storage device.

7. The method of claim 1, wherein the LVT subset dump and the LVT update journal are stored in a reserved portion of the cache associated with the reserved logical unit.

8. A system, comprising:
   a processor; and
   a memory having instruction stored thereon which, when executed by the processor, performs an operation for writing data to a solid state storage device, the operation comprising:
      receiving a request to write data to a logical block address in a memory component of the solid state storage device;
      writing the data to a virtual block address in the memory component of the solid state storage device;
      storing the virtual block address in a logical-to-virtual table (LVT) subset dump located in a reserved logical unit of the solid state storage device, wherein the LVT subset dump comprises a rotating dump in which information about write operations is periodically written to the solid state storage device based on a rate of incoming write requests to a controller of the solid state storage device such that newest writes to the rotating dump overwrite oldest data in the rotating dump;
      storing a mapping between the logical block address and the virtual block address in a LVT update journal located in the reserved logical unit of the solid state storage device, wherein the LVT update journal is buffered such that a number of journal entries are stored in a buffer until a threshold number of journal entries are committed to the LVT update journal; and
      storing a pointer to a current address in the LVT update journal in the buffer at which the mapping between the logical block address and the virtual block address is stored.

9. The system of claim 8, wherein the operation further comprises:
   upon losing power supplied to the solid state storage device, storing the LVT subset dump and the LVT update journal in a non-volatile memory component of the solid state storage device, and storing journal entries in the buffer to the non-volatile memory component of the solid state storage device.

10. The system of claim 9, wherein the LVT subset dump and the LVT update journal and the buffered journal entries are written to the non-volatile memory component within a discharge time of a capacitor in the solid state storage device.

11. The system of claim 9, wherein the operation further comprises:
upon reconnecting the solid state storage device to a power source:
restoring the LVT subset dump and the LVT update journal from the non-volatile memory component of the solid state storage device to the cache of the solid state storage device, and
restoring a logical address-to-virtual address table of an external logical unit based on the LVT subset dump, the LVT update journal, and the buffered journal entries.

12. The system of claim 11, wherein the operation further comprises
identifying a failure to restore the LVT subset dump from the non-volatile memory component; and
upon receiving a request for data stored at a logical block address included in the LVT subset dump, returning a reserved value.

13. The system of claim 11, wherein the operation further comprises
identifying a failure to restore the LVT update journal from the non-volatile memory component; and
restoring a previously committed LVT update journal from a reserved portion of the memory component of the solid state storage device.

14. The system of claim 8, wherein the LVT subset dump and the LVT update journal are stored in a reserved portion of the cache associated with the reserved logical unit.

15. A non-transitory computer-readable medium having instructions stored thereon which, when executed by a processor, performs an operation for writing data to a solid state storage device, the operation comprising:
receiving a request to write data to a logical block address in a memory component of the solid state storage device;
writing the data to a virtual block address in the memory component of the solid state storage device;
storing the virtual block address in a logical-to-virtual table (LVT) subset dump located in a reserved logical unit of the solid state storage device, wherein the LVT subset dump comprises a rotating dump in which information about write operations is periodically written to the solid state storage device based on a rate of incoming write requests to a controller of the solid state storage device such that newest writes to the rotating dump overwrite oldest data in the rotating dump;
storing a mapping between the logical block address and the virtual block address in a LVT update journal located in the reserved logical unit of the solid state storage device, wherein the LVT update journal is buffered such that a number of journal entries are stored in a buffer until a threshold number of journal entries are committed to the LVT update journal; and
storing a pointer to a current address in the LVT update journal in the buffer at which the mapping between the logical block address and the virtual block address is stored.

16. The non-transitory computer-readable medium of claim 15, wherein the operation further comprises:
upon losing power supplied to the solid state storage device, storing the LVT subset dump and the LVT update journal in a non-volatile memory component of the solid state storage device, and storing journal entries in the buffer to the non-volatile memory component of the solid state storage device.

17. The non-transitory computer-readable medium of claim 16, wherein the LVT subset dump and the LVT update journal and the buffered journal entries are written to the non-volatile memory component within a discharge time of a capacitor in the solid state storage device.

18. The non-transitory computer-readable medium of claim 16, wherein the operation further comprises:
upon reconnecting the solid state storage device to a power source:
restoring the LVT subset dump and the LVT update journal from the non-volatile memory component of the solid state storage device to the cache of the solid state storage device, and
restoring a logical address-to-virtual address table of an external logical unit based on the LVT subset dump, the LVT update journal, and the buffered journal entries.

19. The non-transitory computer-readable medium of claim 18, wherein the operation further comprises:
identifying a failure to restore the LVT subset dump from the non-volatile memory component; and
upon receiving a request for data stored at a logical block address included in the LVT subset dump, returning a reserved value.

20. The non-transitory computer-readable medium of claim 18, wherein the operation further comprises:
identifying a failure to restore the LVT update journal from the non-volatile memory component; and
restoring a previously committed LVT update journal from a reserved portion of the memory component of the solid state storage device.

* * * * *